(12) United States Patent
Gunaseelan et al.

(10) Patent No.: US 6,601,136 B2
(45) Date of Patent: Jul. 29, 2003

(54) MEDIA SERVER SYSTEM AND PROCESS HAVING DEVICE INDEPENDENT NEAR-ONLINE STORAGE SUPPORT

(75) Inventors: Lakshminarayanan Gunaseelan, Milpitas, CA (US); Eliahu Lauris, Sunnyvale, CA (US)

(73) Assignee: Kasenna, Inc., Mountain View, CA (US)

(*) Notice: Subject to any disclaimer, the term of this patent is extended or adjusted under 35 U.S.C. 154(b) by 0 days.

(21) Appl. No.: 10/037,756

(22) Filed: Oct. 22, 2001

(65) Prior Publication Data

US 2002/0152364 A1 Oct. 17, 2002

Related U.S. Application Data

(63) Continuation of application No. 09/183,877, filed on Oct. 30, 1998, now abandoned.

(51) Int. Cl.[7] .............................................. G06F 12/00
(52) U.S. Cl. ...................... 711/112; 711/169; 709/231
(58) Field of Search ........................ 711/112, 111, 114, 711/169; 709/208, 213, 217, 219, 231

(56) References Cited

U.S. PATENT DOCUMENTS 5,761,667 A * 6/1998 Koeppen .................... 707/101

OTHER PUBLICATIONS

Crutcher et al., The Networked Video Jukebox, 1994 IEEE, pp. 105–120.*
Eitel, backup and Storage Management in Distributed Heterogeneous Environments, 1994 IEEE, pp. 124–126.*
Wu et al., "On the Design of Stream Pumping Engines for Scalable Video–on–Demand Systmes", © 1997, IEEE, p. 381–385.*
Ludescher et al., file Storage management for TFTR Physics Data, 1992 IEEE, pp. 856–859.*
Byrne, Evaluating jukebox performance, 1997 IEEE, pp. 70–73.*
Jun et al., Video Allocation Methods in a Multi–level Server for Large–scale VOD Services, 1998 IEEE, pp. 1309–1318.*
Ford et al., redundant Arrays of Independent Libraries (RAIL): A Tertiary Storage System, 1996 IEEE, pp. 280–285.*
Goodheart et al., The Magic Garden Explained, © 1994, p. 40, 41, 357–360, 497, 498.

* cited by examiner

*Primary Examiner*—Do Hyun Yoo
*Assistant Examiner*—Brian R. Peugh
(74) *Attorney, Agent, or Firm*—Dorsey & Whitney LLP; R. Michael Ananian

(57) ABSTRACT

A media server system and process are disclosed that have device independent near-online storage support. A plurality of media assets are stored in online storage, and a plurality of media assets are stored on tertiary storage devices in tertiary storage to provide near-online storage. A media server, having access to the online storage and the tertiary storage, receives a user request for a media asset. The media server then determines whether the requested media asset needs to be loaded from the tertiary storage. If so, the media server allocates space in the online storage for the requested media asset. A transfer process specific to the tertiary storage devices is then used to transfer content of the requested media asset to the online storage.

14 Claims, 3 Drawing Sheets

MEDIA SERVER SYSTEM AND PROCESS HAVING DEVICE INDEPENDENT NEAR-ONLINE STORAGE SUPPORT

This is a continuation of application Ser. No. 09/183,877 filed Oct. 30, 1998, now abandoned.

TECHNICAL FIELD OF THE INVENTION

The present invention relates in general to the field of digital media and, more particularly, to a media server system and process having device independent near-online storage support.

BACKGROUND OF THE INVENTION

Digital media files are widely used to record a variety of media assets-for playback on computer systems. A decoder or player is a software or hardware component, such as a software application or hardware card, that receives digital media data and renders it for playback, for example, as a displayable image, playable audio or a combination of the two. One distribution method used for digital media files is a media server which can hold a large repository of media files. The media files can be streamed as digital packets across a network connection, such as a local area network, wide area network or the Internet, to client systems for playback. The media server usually divides the media files into data packets which are then delivered to the client system across the network connection.

Such digital media streaming systems typically stream content from data stored on hard disk drives. However, in an installation with a very large number of digital media assets (e.g., government agencies, various studios, etc.), it may not be practical to have all of the desired asset content stored online on hard disk drives. Yet there remains a need to be able to stream any of the desired assets with a short latency. To address this problem, various near-online storage devices are available that provide tertiary storage for digital media assets. These devices typically provide permanent storage for media assets in storage devices such as CD-ROMs and magnetic tape devices.

One significant problem that arises is that near-online storage devices can vary widely in terms of the mechanisms employed for the actual transfer of data. Further, there are variations in the interface provided for controlling the devices and the transfer of data and in the performance characteristics. Thus, it can be problematic for a digital media server system to provide support for the various possible types of near-online storage devices.

SUMMARY OF THE INVENTION

In accordance with the present invention, a media server system and process are disclosed that have device independent near-online storage support and that provide advantages over conventional digital media server systems.

According to one aspect of the present invention, a media server system and process have device independent near-online storage support. A plurality of media assets are stored in online storage, and a plurality of media assets are stored on tertiary storage devices in tertiary storage to provide near-online storage. A media server, having access to the online storage and the tertiary storage, receives a user request for a media asset. The media server then determines whether the requested media asset needs to be loaded from the tertiary storage. If so, the media server allocates space in the online storage for the requested media asset. A transfer process specific to the tertiary storage devices is then used to transfer content of the requested media asset to the online storage A technical advantage of the present invention is the ability for a media server system to remain device independent with respect to near-online storage devices and be able to interface with such devices uniformly. At the same time, the media server system has the ability to exploit unique performance enhancement opportunities of the near-online storage devices.

It is another technical advantage that the media server system has the ability to accommodate unforeseen technological innovations and to integrate with new forms of near-online storage devices.

Other technical advantages should be readily apparent to one skilled in the art from the figures, description and claims.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE INVENTION

Figure 1:
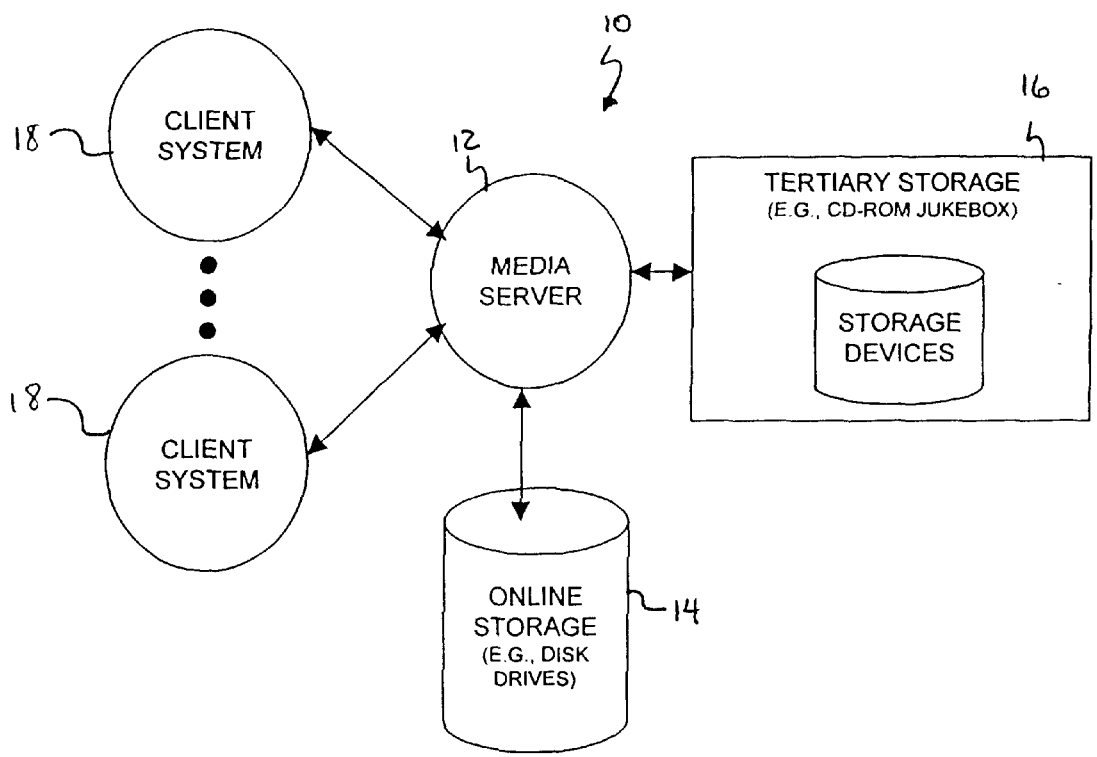
FIG. 1 is a block diagram of one embodiment of a media server environment.

FIG. 1 is a diagram of one embodiment of a media server environment, indicated generally at 10. Environment 10 includes a media server 12 that has access to digital media assets stored in online storage 14. Online storage 14, for example, can be an array of hard disk drives. Media server 12 can also access digital media assets stored in tertiary storage 16, such as a CD ROM jukebox or a tape drive system, which provides near-online storage for digital media assets. Media server 12 is connected to a plurality of client systems 18 across a communication network. The communication network can be supported by a variety of connection types such as a local area network, wide area network, and the Internet.

In general, a user of a client system 18 can send a request to media server 12 across the communication network. The request can identify a digital media title that the user desires to playback on client system 18. Media server 12 responds by accessing the appropriate media asset from online storage 14. If the media asset is not available in online storage 14, media server 12 can initiate an asset transfer from tertiary storage 16 to online storage 14. Once the media asset is available, media server 12 separates the asset into data packets and streams the data packets to client system 18. Client system 18 receives the data packets and uses a decoder to process the data packets and playback the digital media data. Further, although not shown in FIG. 1, media server environment 10 also can provide real-time streaming of digital media where the source is live encoded and transmitted across the network to client systems. Thus, rather than digital media data originating from a file stored on a storage device, the data originates from a live feed. The digital media is then often multicast to clients systems which each use decoders to process the data packets and playback the digital media data.

In the embodiment of FIG. 1, media server 12 provides support for near-online storage in a streaming environment. Based upon user requests (such as clicking on the URL for a video), media server 12 will automatically load assets from tertiary storage 16 onto disk storage 14 and provide playback. Media server 12 can also automatically purge less popular assets from the disk storage 14 to make room for those assets in demand. Thus, in this scheme, more popular assets will end up on disk storage 14, while less popular assets will remain in tertiary storage 16. Online disk storage 14 can thereby act as a cache for a large number of assets stored in tertiary storage 16. There are many potential policies for determining what to keep on disk storage 14 based, for example, upon: current time, current load, the desire to use resources for playback and the willingness to deny requests, and the desire to be responsive and the willingness to tolerate thrashing.

With respect to tertiary storage 16, media server 12 is device independent. This allows media server 12 to interface with a variety of types of devices (e.g., CD jukeboxes, tape devices, DVDs, etc.) from a number of manufacturers. Generally, in addition to a file system interface, each manufacturer offers special software for administering their devices and for moving content onto and out of their devices (e.g., APIs and tools). The device independence of media server 12 allows it to take advantage of any such special software to increase system performance.

Figure 2:
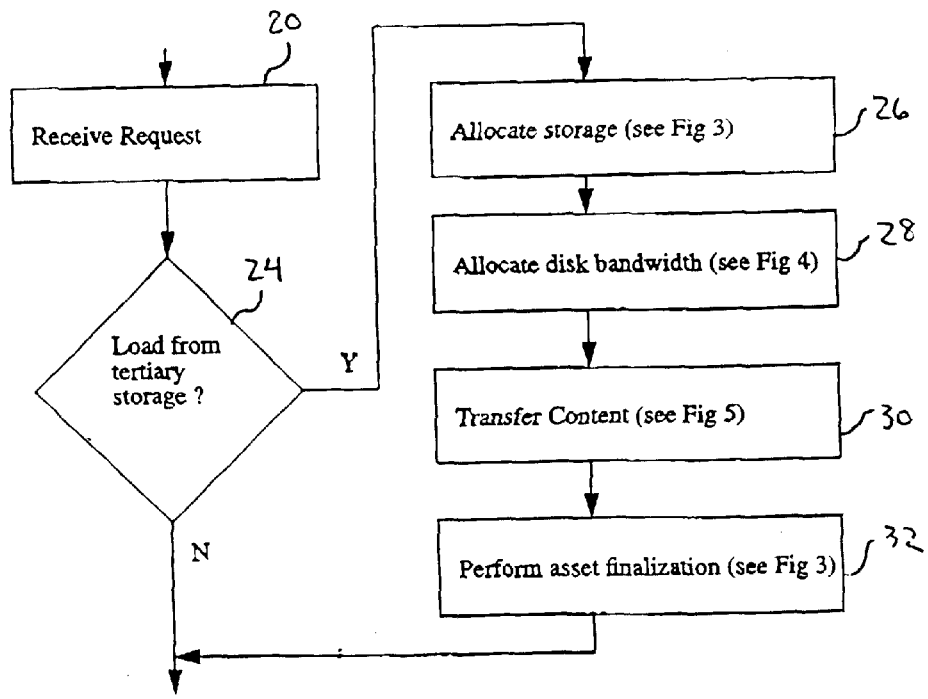
FIG. 2 is a flow chart of one embodiment of a process for near-online storage support.
Figure 3:
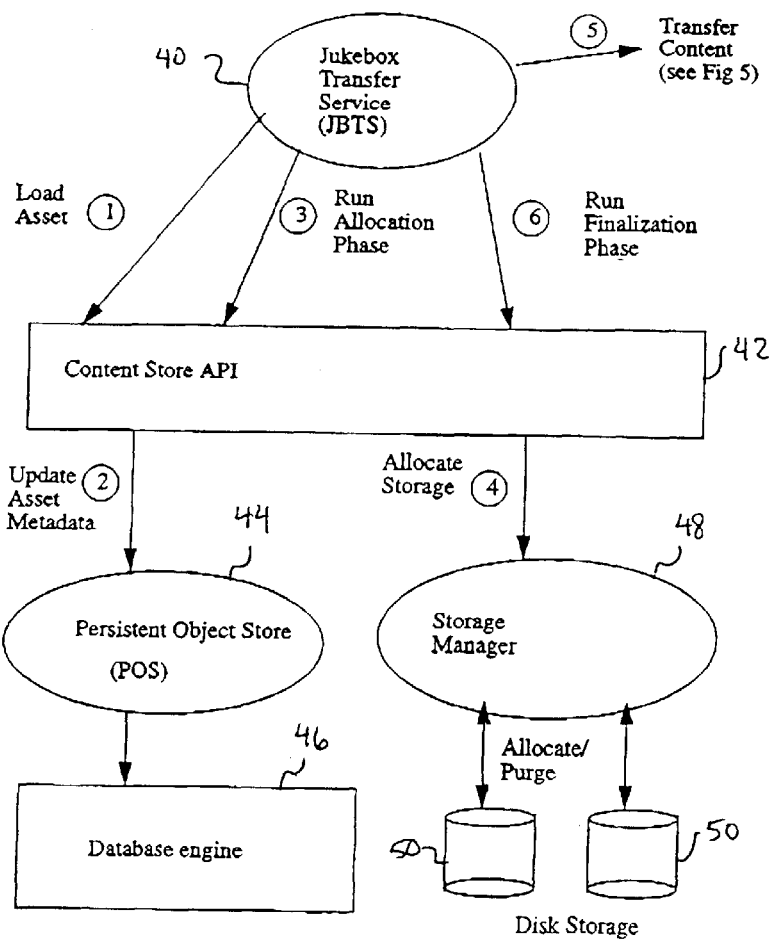
FIG. 3 is a flow diagram of one embodiment of allocating storage and asset finalization.

FIG. 2 is a flow chart of one embodiment of a process for near-online storage support. In step 20 of FIG. 2, a media server receives a request to play a digital media asset. In step 24, the media server determines whether the asset needs to be loaded from tertiary storage. If not, the asset is played as normal for an online asset. If the asset does need to be loaded from tertiary storage, then a number of steps are performed. In step 26, storage space is allocated for placing the asset on online storage (e.g., disk storage). FIG. 3 illustrates one embodiment of this allocation of storage space. Further, allocation of storage may involve finding a victim asset on disk and purging that asset to make room for the newly loaded asset. The victim asset would then be left in the offline state. Loading from tertiary storage also comprises, in step 28, allocating disk bandwidth for the transfer of the asset. This can also involve the assignment of a service that will perform the physical transfer through a multi-resolver component. One embodiment of this allocation of bandwidth is shown, for example, in FIG. 4.

Figure 5:
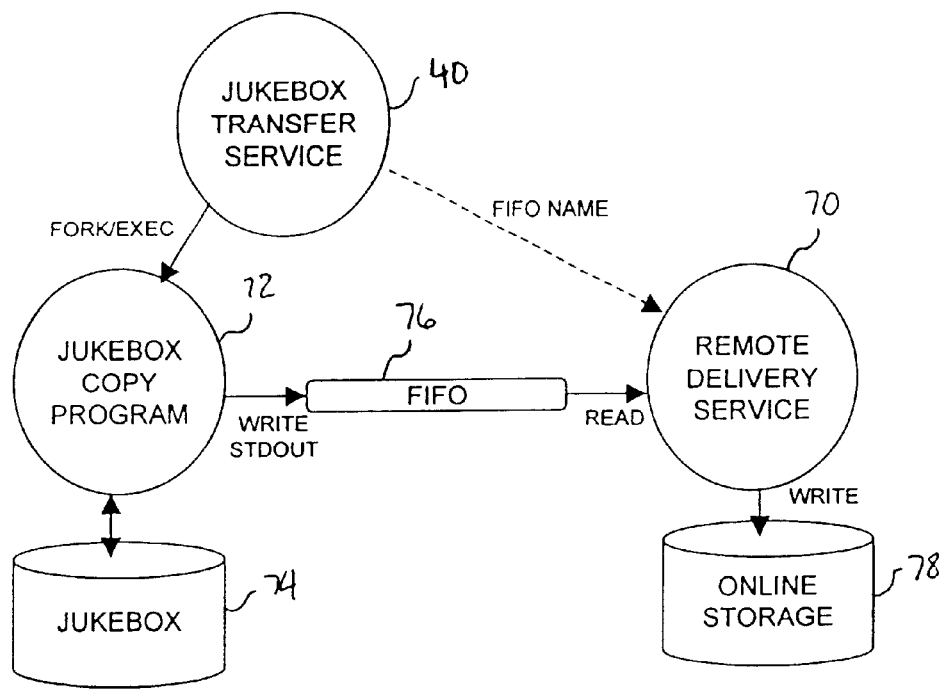
FIG. 5 is a flow diagram of one embodiment of content transfer.

To continue the load, in step 30, the media server physically transfers the file or content of the asset front near-online storage to online storage (e.g., hard disk storage) using placement and disk bandwidth guarantees obtained in steps 26 and 28. FIG. 5 illustrates one embodiment of this content transfer. Then, in step 32, the media server performs asset finalization. This involves updating the asset state to indicate that the asset is now online. Further, VCR trick files and other data can be generated if necessary. One embodiment of asset finalization is also illustrated in FIG. 3.

This near-online asset transfer scheme provides significant advantages to a media server system. The task of physically transferring content, in step 30, can be left to device-specific transfer processes that can exploit any fast-transfer capabilities, or other special capabilities, of the particular tertiary device. This allows many device specific transfer processes to be written and integrated into the media server. Using this architecture, for example, support can be successfully integrated for CD ROM jukeboxes manufactured by TRACER, LUMINEX, K-PAR, IXOS, EMASS, PIONEER and SONY as well as tape devices from EMASS. Another advantage of this scheme is that the architecture along with the system primitive commands (loadAsset and unloadAsset) can allow different policies to be employed in identifying victim assets on disk. The policy could be least-recently-played, least-frequently played, or others. The system architecture allows different policy schemes to be integrated for managing the cache of on-disk content.

FIG. 3 is a flow diagram of one embodiment of allocating storage and asset finalization. This embodiment addresses, for example, a CD-ROM jukebox as the tertiary storage device. With respect to CD-ROM jukeboxes, each jukebox typically can contain a large number of CD-ROM devices (e.g., anywhere from fifty to several hundred) and a much smaller number of read-drives (e.g., one to four). Also, there is often some kind of robotic interface that can move a CD-ROM from its slot into a read-drive. The access to CD-ROM resident files is then accomplished through a middle layer, provided by software vendors, such as K-PAR, LUMINEX, TRACER, etc. A common feature of all these packages is that there is a UNIX file-path access to any CD-ROM resident file. In other words, files and directories can be listed or read using regular UNIX calls and commands. The access software also usually includes administration and disk caching. In the embodiment of FIG. 3, a jukebox transfer service 40 keeps the state of the transfer and changes to the state of an affected asset so that the state is not lost in case of service crash or interruption (such as loss of electrical power).

As shown in FIG. 3, jukebox transfer service (JBTS) 40 makes a request to load the requested asset to a content store application program interface (API) 42. This request to content store API 42 effects a change of the asset state to "loading" and prevents the asset from being accidentally deleted or modified by another process. The state is updated in asset metadata held in a persistent object store (POS) 44. Persistent object store 44, for example, can comprise a persistent object in a database accessed through a database engine 46. Next, jukebox transfer service 40 makes a request to "run allocation phase." This request is forwarded by content store API 42 to a storage manager 48. Storage manager 48 is a component of the media server responsible for allocation of online disk storage and disk bandwidth. In this process, storage manager 48 allocates storage for placement of the asset on available file system disk storage 50. Then, jukebox transfer service 40 makes a request to physically transfer the data from near-online storage to online storage. Following the physical transfer, jukebox transfer service 40 makes a request to "run finalize phase." In this phase, content store API 42 generates auxiliary files used for fast forward and rewind actions, trims any excess disk space as well as updates asset metadata in persistent object store 44 to indicate that the asset is now available on online storage.

Figure 4:
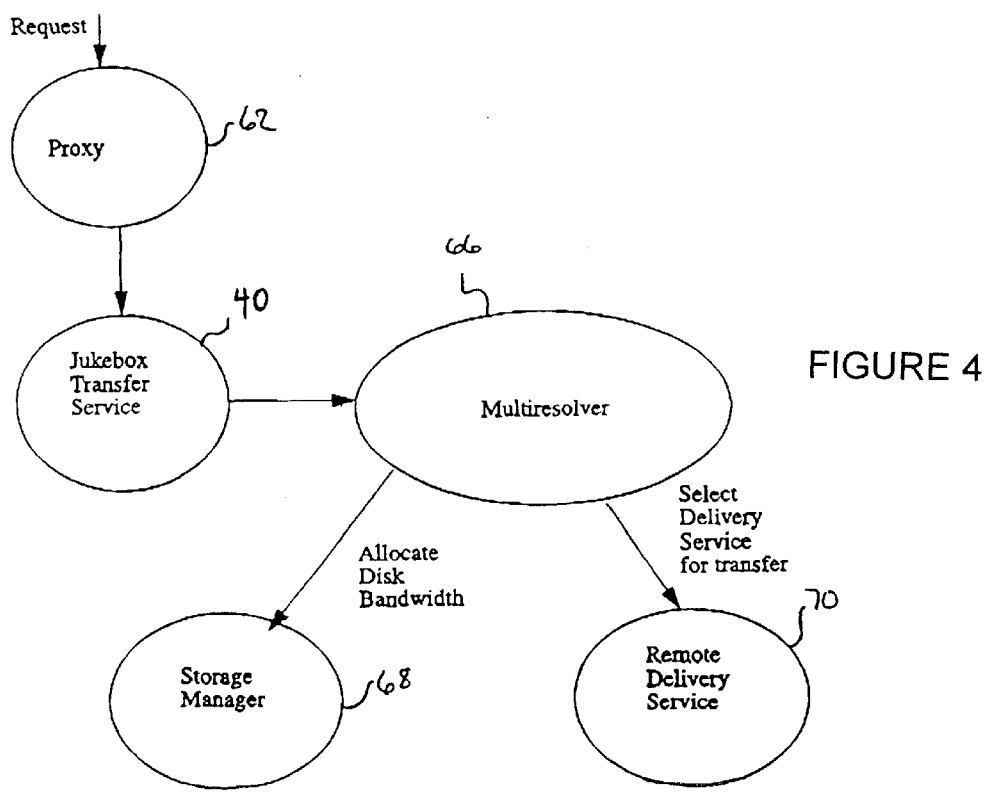
FIG. 4 is a flow diagram of one embodiment of allocating disk bandwidth.

FIG. 4 is a flow diagram of one embodiment of allocating disk bandwidth. As shown, a proxy service 62 can receive and process a client request for assets and can invoke jukebox transfer service 40. In the embodiment of FIG. 4, requests to allocate disk bandwidth either for playback or recording are made through a common component, multiresolver 66. Multiresolver 66 is responsible for contacting a storage manager 68 to allocate disk bandwidth. Multiresolver 66 also contacts a connection manager (not shown) for allocating network bandwidth, if necessary. Multiresolver 66 further chooses a delivery service to perform the playback or recording. Within the context of jukebox transfer service 40, multiresolver 66 is invoked with an "import" delivery specification. Multiresolver 66 responds by communicating with storage manager 68 to allocate disk bandwidth for recording. Multiresolver 66 also chooses a delivery service to do the content transfer. In this case, the target delivery service can be a remote delivery service (RDS) 70. Multiresolver 66 can also have an interface which allows a requestor to pass delivery service-specific parameters such as passing the name of a pipe (FIFO) from which remote delivery service 70 should read. The role of the pipe (FIFO) is described, for example, with respect to FIG. 5.

FIG. 5 is a flow diagram of one embodiment of content transfer. As shown, jukebox transfer service 40 invokes a device specific jukebox copy program 72 and creates a pipe (FIFO) 76. Jukebox copy program 72 accesses a jukebox 74 and transfers content data from an appropriate CD ROM to pipe 76. Jukebox transfer service 40 also provides the name of pipe 76 to remote delivery service 70. In the embodiment of FIG. 5, remote delivery service 70 knows how to read from one file source and write to another, and a read from a named pipe 76 appears to remote delivery service 70 like a read from a file. Remote delivery service 70 reads data from pipe 76 and writes the data to online disk storage 78. Disk storage 78 provides online storage for streaming the asset to its destination.

In operation, jukebox transfer service 40 duplicates the write-end file descriptor of the pipe 76 to a "stdout" file descriptor and forks/executes jukebox copy program 72. Jukebox copy program 72 operates to pump the data as fast as possible from a CD-ROM resident file to stdout. Since stdout is actually the write descriptor of the pipe 76, that is where the data goes. When jukebox copy program 72 has written all the data to the stdout, which in fact is going into the write-end of pipe 76, it will simply exit. Shortly thereafter, remote delivery service 70 will get an end-of-file indication, will call mark that data as filled in, and will close the reading-end of pipe 76.

Since jukebox transfer service 74 started jukebox copy program 72, it will get a signal when jukebox copy program 72 has exited. This provides the indication that data transfer completed. Note that there is no need for jukebox transfer service 40 to poll remote delivery service 70, which is consistent with completing the transfer as fast as possible. At the completion of data transfer, jukebox transfer service 72 runs the finalization phase on the task. In response, content processors are invoked to generate auxiliary files at that point and mark asset as available. Upon completion of the finalization phase, the asset is available for playback and jukebox transfer service 40 can safely discard the transfer task as complete.

Figure 6:
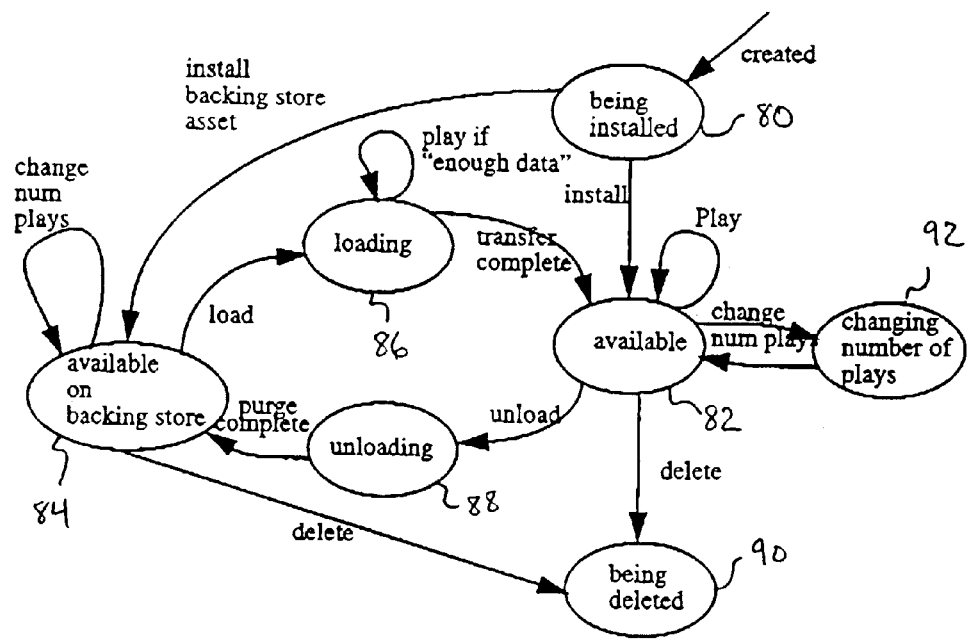
FIG. 6 is a state diagram of one embodiment of a process for playback of digital media with near-online storage support.

FIG. 6 is a state diagram of one embodiment of a process for playback of digital media with near-online storage support. As shown, the installation of an asset on the system initially places it in a "being installed" stated 80. From this state, the asset can be directly installed such that it is in an "available" state 82. Alternatively, a backing store of the asset can be installed placing the asset in an "available on backing store" state 84. In this state, a load event temporarily changes the asset to a "loading" state 86 while the asset is moved to online storage. After completion of the transfer, the asset is in "available" state 82. From "available" state 82, an asset can be unloaded which temporarily places it in an "unloading" state 88 before it returns to the "available on backing store" state 84.

Further, while in "loading" state 86, playback of the asset can begin if there is enough data available to do so. While in "available" state 82, the number of plays can be changed which moves the asset temporarily to a "changing number of plays" state 92. The number of plays can also be changed from the "available on backing store" state 84. From either "available" state 82 or "available on backing store" state 84, the asset can be deleted which moves it to a "being deleted" state 90. After the deletion is complete, the asset "disappears" from the system.

As shown in FIG. 6, playback of an asset can be permitted while it is loading from the backing storage device (e.g., CD-ROM jukebox). This is quite useful for long assets that are several hours in duration since they can take a long time to load. By allowing playback to begin before the load is complete, the client does not have to wait for the entire asset to load from the backing storage. The playback can begin as soon as some initial segment of data is transferred. Such playback of partially loaded asset can be permitted, for example, only if the transfer rate of the asset from the backing store device is higher than the playback rate (or data consumption rate) of the client. The amount of initial data that is required for allowing such playback (while asset transfer is in progress) can be determined from the delivery service requirements, which can require, for example, 512 kilobytes of data.

As mentioned above, each asset has a state indicating whether it is online or offline and can have an associated flag ("can being playback") indicating whether enough bytes are available to permit playback while loading is in progress. As shown in FIG. 6, when an asset installation is initiated, the asset is in "being installed" state 80. For a non-backing store asset, when the asset installation completes, the asset enters "available" state 82. This is the state in which an asset is normally available for playback. For backing store assets, the asset is in "available on backing store" state 84 after installation. When a user attempts to play an asset from this state 84, a "loadAsset" primitive can be called placing the asset in "loading" state 86. At this point, the device specific transfer program begins transferring data from the backing storage to online storage. As soon as "enough data" has been transferred, the "can begin playback" flag can be set to permit playbacks from that point forward. When the transfer is complete, the asset enters "available" state 82 as mentioned above. At any point, to determine whether playback can be permitted on an asset, the following simple rule can be used:

if (asset.state==available ||asset.canBeginPlayback==true) {permit playback;}

Once the data starts moving from the storage device to disk storage, the media server can play it after a short, administrator-configurable delay. An assumption can be made that the average transfer rate from tertiary device to disk storage will be faster than the playback rate. However, it is possible that, due to process contention, memory swapping or other factors, the transfer rate may temporarily fall below the playback rate. Therefore, capability is provided for the administrator to specify a time buffer, i.e. delay, before the media server starts playing the asset. This delay should be empirically based on the specific customer configuration, such as hardware, amount of disk and memory, etc. It should generally be no more than about fifteen seconds. In case the average transfer rate is less than the playback rate, the asset can be loaded completely before playing (i.e., as discussed above).

Further, an asset can have a number of higher level assets defined on it. These can be referred to as derived assets. Examples of such assets include sequential assets and clip assets. Such assets can also go through state transitions as described above when one of the underlying assets go offline or online. That is, when an underlying asset goes to the "available on backing store" state, all of the higher level assets defined on it also enter the "available on backing store" state. Similarly, when an underlying asset enters the "available" state from the "available on backing store" state, then the higher level assets can enter the "available" state as well if all other children of the higher level assets are in the "available" state.

According to the present invention, a media server can implement support for device independent near-online storage that treats varied types of tertiary storage devices uniformly and yet allows for exploitation of unique performance characteristics of each type of tertiary storage. One core aspect of this asset management scheme is that it allows an asset to have a permanent backing storage location from which the asset content can be loaded anytime, on demand. The asset management scheme maintains state information for each such asset to indicate whether it is online or offline. Further, a set of primitive commands are provided (e.g., loadAsset and unloadAsset) for state transition between these states. The actual loading of an asset from a tertiary storage device onto disk storage is split into a number of phases: storage allocation, transfer, and asset finalization. The transfer phase can use device specific transfer processes that can exploit any specific fast-transfer characteristics of a particular tertiary storage device.

As discussed, the loading of assets can be device independent in that the details of the middle layer that interfaces to the tertiary storage can be handled by the particular device implementor. However, in this layer, there are a number of helpful common features. One is that there be a UNIX file-path interface to any file on any device within the tertiary storage. Thus, any UNIX call or command that takes a file path should be able to transparently access tertiary storage resident files. Another feature is a command-line program that permits high-speed reading of data. This program takes as parameters a fully-qualified file name, offset and length. The program will than pipe the data as fast as possible from the file to stdout. The major goals of this are to minimize latency in starting the transfer, to support many simultaneous reads from multiple files, and to maximize the transfer rate. In addition, the command-line program, given a file name, offset and length, returns estimates on time to start the transfer and time to complete the transfer. A further helpful feature is a command-line program that returns on-line/off-line status for a particular file. In other words, if the device on which the file is resident is in the tertiary storage and enabled, the command will return that the file is on-line. Additionally, an HTML-based administration and configuration interface is a helpful to allow the media server to have a URL link to the appropriate configuration screens. Default versions of these programs can be implemented in case a particular tertiary storage does not support the above features, but the performance and accuracy of default programs may be worse than what could be achieved if an implementor writes them itself.

Using the present system, a system administrator can install assets resident in tertiary storage resident and indicate to the media server that the asset is backed by tertiary storage. Tertiary storage backed assets are different in that such assets first need to be moved to disk storage before being played back and can be paged out of disk storage by a purging algorithm. To install a tertiary storage backed asset, the media server scans the asset to perform sanity checks and compute sizes for auxiliary files. The media server then creates metadata for the handle and the asset tree, and the path to the backing file is stored. The placement type for the asset indicates that the asset is backed by tertiary storage.

After installation is complete, the user interface indicates whether the tertiary storage backed asset is currently resident on disk storage or whether a delay to load the asset is required before playback can begin. This indication can be accomplished, for example, either by rendering the asset name on the screen in a different format.

The transfer of a tertiary storage asset to disk storage, or swap-in, can be initiated, for example, when a user clicks on an asset URL, and the asset is not on disk storage at that time. In one implementation, the request goes to a server which responds with a document containing the handle name, server name and other static details of the asset back to the user's web browser. The browser then invokes a streamplayer application. The streamplayer makes a library call to the media server which determines whether the asset is a tertiary storage backed asset and whether it is currently on disk storage. If it is on disk storage, the regular playback process proceeds. If, however, the asset is not on disk storage, a special parameter is provided to the streamplayer to indicate that the asset needs to be loaded, and the media server initiates the process to transfer the asset to disk storage.

In this implementation, the special parameter to the streamplayer indicates that the tertiary storage backed asset is being transferred to disk and provides an estimate for the time the transfer will take. At that point, streamplayer invokes a special count-down helper application, rather than the regular player. The streamplayer itself can then exit and free up the browser from which it was invoked. The count-down application presents a small, separate browser window with a clock ticking down. When the count-down reaches zero, the application will send the video URL again to the web server. At that point, the same processing as above is repeated. If the asset happens to be on disk storage, the media server returns normal parameters, and the streamplayer will start up the player. If not, the media server needs to detect that the transfer to disk storage had previously been initiated and return back the current time estimate to completion. This algorithm will also work if another user requests the same asset while the first transfer request is still in effect. It should be noted that with this implementation, even once the asset is transferred to disk storage, the user who initiated the transfer is not guaranteed to be able to play it. The play could fail for a number of reasons, such as disk storage or network bandwidth not available or the appropriate player not installed.

As discussed above, there can be a special transfer service operating on the media server to effect transfer of the asset to disk storage. In one case, the media server has a jukebox transfer service (JBTS) whose responsibility is to handle transfers from a CD-ROM jukebox to disk storage. Also as discussed above, tertiary storage backed assets that had previously been transferred to disk storage can be purged to make room for new assets being transferred. In this scheme, both tertiary storage backed and regular assets can be mixed on same file systems managed by the media server, but only tertiary storage backed assets can be purged to make room for another tertiary storage backed asset.

On the above media server, the storage manager maintains data on asset usage, such as popularity (frequency of playouts) and least-recent usage, in order to implement cache management. When a call is made to load a tertiary storage resident asset, as a result of the allocation phase, the storage manager finds space for the asset using a cache management scheme. If there is no space available, the storage manager chooses a tertiary storage backed asset to be purged. If no such asset can be found, the storage manager returns a "space unavailable" error and the allocation phase call fails.

When playing a partially installed asset, the media server needs to decide at what point to start playback of a partially installed asset or whether to wait until the asset is fully installed. In one embodiment, this is based on the configured playback delay, D, the playback rate, P, and the amount of data, A, that has been transferred and the transfer rate, T. In this scheme, if P>T, the media server should wait until the asset: is fully installed. Otherwise, the media server should wait for the condition: A/P>=D before initiating play back.

Although the present invention has been described in detail, it should be understood that various changes, substitutions and alterations can be made thereto without departing from the spirit and scope of the invention as defined by the appended claims.

What is claimed is:

1. A media server system having online storage storing a plurality of media assets, tertiary storage storing a plurality of media assets on tertiary storage devices to provide near-online storage, a media server having access to the online storage and the tertiary storage, the media server operating to receive a user request for a media asset, determine whether the requested media asset needs to be loaded from the tertiary storage, if so, to allocate storage space in the online storage for the requested media asset before transferring content specific to the tertiary storage devices to transfer content of the requested media asset to the online storage, the media server system comprising:

a storage manager that allocates bandwidth on the online storage for transfer of the requested media asset from tertiary storage to online storage, wherein bandwidth allocation comprises allocation for timing-dependent applications including a video content delivery applications timing requirement;

an application program interface, the application program interface including a UNIX file path interface that accesses media assets stored on the tertiary storage devices independent of vendor specific device drivers:

a plurality of transfer services specific to the tertiary storage devices that transfer the requested media asset to the application program interface;

state information associated with the requested media asset the state information protecting the integrity of the requested media asset by indicating that the requested media asset is being transferred and preventing the modification or deletion of the requested media asset, the state information also indicating that the requested media asset is online once it has been transferred from tertiary storage to online storage; and a pipe data structure created by the transfer service of the tertiary device for transferring content from tertiary storage to online storage, the pipe comprising a first in first out queue that has a read end and a write end, the pipe data structure providing a way to use either the device independent application program interface or one of the device-specific plurality of transfer services to perform the transfer.

2. A media server system according to claim 1, wherein said online storage comprises hard disk storage.

3. A media server system according to claim 1, wherein said tertiary storage devices comprise magnetic tape devices.

4. A media server system according to claim 1, wherein said allocating storage space comprises finding a victim media asset and purging the victim media asset.

5. A media server system according to claim 4, wherein said allocating space further comprises setting a state of the victim media asset to an offline state.

6. A media server system according to claim 4, wherein said victim asset comprises a least recently loaded media asset having backup storage in said tertiary storage.

7. A media server system according to claim 4, wherein said victim asset comprises a least frequently requested media asset having backup storage in said tertiary storage.

8. A media server system according to claim 1, wherein said tertiary storage devices comprise CD-ROM devices and said tertiary storage comprises a CD-ROM jukebox.

9. A media server system having online storage storing a plurality of media assets, tertiary storage storing a plurality of media assets on tertiary storage devices to provide near-online storage, a media server having access to the online storage and the tertiary storage, the media server operating to receive a user request for a media asset, determine whether the requested media asset needs to be loaded from the tertiary storage, if so, to allocate storage space in the online storage for the requested media asset before transferring content specific to the tertiary storage devices to transfer content of the requested media asset to the online storage, the media server system comprising:

a storage manager that allocates bandwidth on the online storage for transfer of the requested media asset from tertiary storage to online storage, wherein bandwidth allocation comprises allocation for timing-dependent applications including a video content delivery applications timing requirement;

an application program interface, the application program including a UNIX file path interface that access media assets stored on the tertiary storage devices independent of vendor specific device drivers;

a plurality of transfer services specific to the tertiary storage devices that transfer the requested media asset to the application program interface;

state information associated with the requested media asset, the state information protecting the integrity of the requested media asset by indicating that the requested media asset is being transferred and preventing the modification of deletion of the requested media asset, the state information also indicating that the requested media asset is online once it has been transferred from tertiary storage to online storage;

a pipe data structure created by the transfer service of the tertiary device for transferring content from tertiary storage to online storage, the pipe comprising a first in first out queue that has a read end and a write end, the pipe data structure providing a way to use either the device independent application program interface or one of the device-specific plurality of transfers services to perform the transfer, the online storage comprises hard disc storage and the media server further operates to allocate disk bandwidth in the online storage prior to transferring content and to perform asset finalization for the requested media asset after transfer of the content, the asset finalization comprises updating a state of the requested media asset to an online state;

the transfer process is specific to a vendor of the tertiary storage device; and allocating space compromises finding a victim media asset and purging the victim media asset and setting a state of the victim media asset to and offline state, and the victim asset comprises a least recently loaded media asset having backup storage in the tertiary storage.

10. A media server system according to claim 9, wherein said online storage comprises hard disk storage.

11. A media server system according to claim 9, wherein said tertiary storage devices comprise magnetic tape devices.

12. A media server system having online storage storing a plurality of media assets, tertiary storage storing a plurality of media assets on tertiary storage devices to provide near-online storage, a media server having access to the online storage end the tertiary storage, the media server operating to receive a user request for a media asset determine whether the requested media asset needs to be loaded from the tertiary storage, if so, to allocate storage space in the online storage for the requested media asset before transferring content specific to the tertiary storage devices to transfer content of the requested media asset to the online storage, the media server system comprising:

a storage manager that allocates bandwidth on the online storage for transfer of the requested media asset from tertiary storage to online storage, wherein bandwidth allocation comprises allocation for timing-dependent applications including a video content delivery applications timing requirement;

an application program interface, the application program interface including a UNIX file path interface that accesses media assets stored on the tertiary storage devices independent of vendor specific device drivers;

a plurality of transfer services specific to the tertiary storage devices that transfer the requested media asset to the application program interface;

state information associated with the requested media asset, the state information protecting the integrity of the requested media asset by indicating that the requested media asset is being transferred and preventing the modification or deletion of the requested media asset, the state information also indicating that the requested media asset is online once it has been transferred from tertiary storage to online storage;

a pipe data structure created by the transfer service of the tertiary device for transferring content from tertiary storage to online storage, the pipe comprising a first in first out queue that has a read end and a write end, the pipe data structure providing a way to use either the device independent application program interface or one of the device-specific plurality of transfer services to perform the transfer;

the online storage comprises hard disk storage and the media server further operates to allocate disk bandwidth in the online storage prior to transferring content and to perform asset finalization for the requested media asset after transfer of the content, the asset finalization comprises updating a state of the requested media asset to an online state;

the transfer process is specific to a vendor of the tertiary device; and allocating space comprises finding a victim media asset and purging the victim media asset and setting a state of the victim media asset to an offline state, and the victim asset comprises a least frequently requested media asset having backup storage in the tertiary storage.

13. A media server system according to claim 12, wherein said online storage comprises hard disk storage.

14. A media server system according to claim 12, wherein said tertiary storage devices comprise magnetic taps devices.

* * * * *